Nov. 6, 1934.  E. H. WILEY ET AL  1,979,782
MECHANICAL ARM AND HAND
Filed Dec. 16, 1931  3 Sheets-Sheet 1

INVENTORS
CARL H. WILEY
ELBERT H. WILEY
BY
ATTORNEY

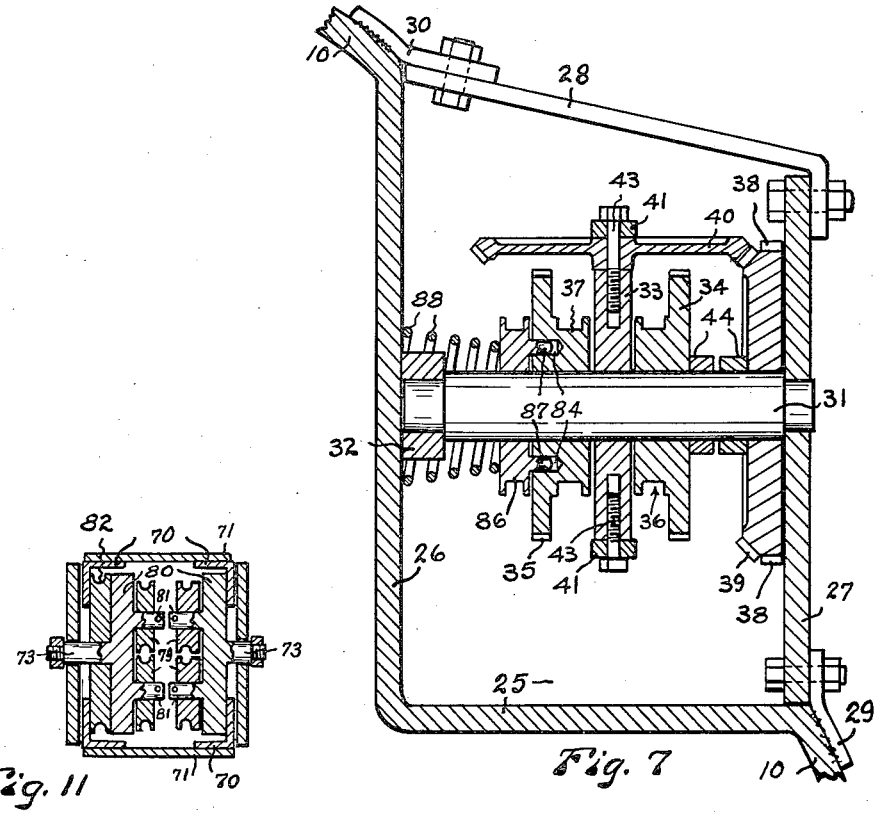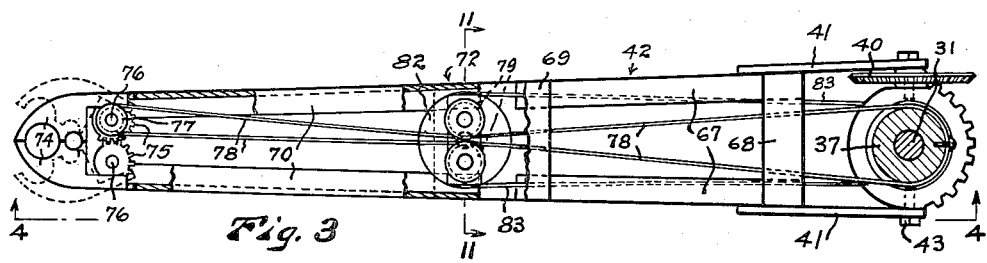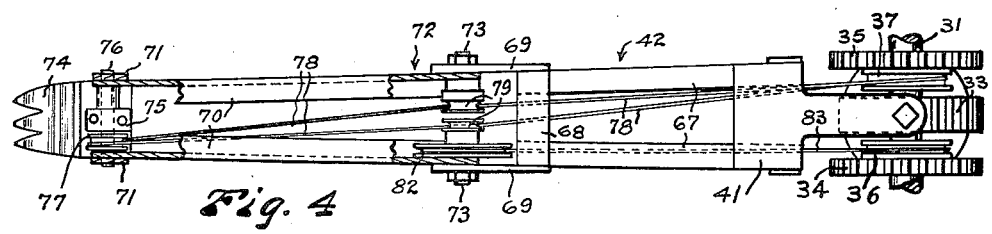

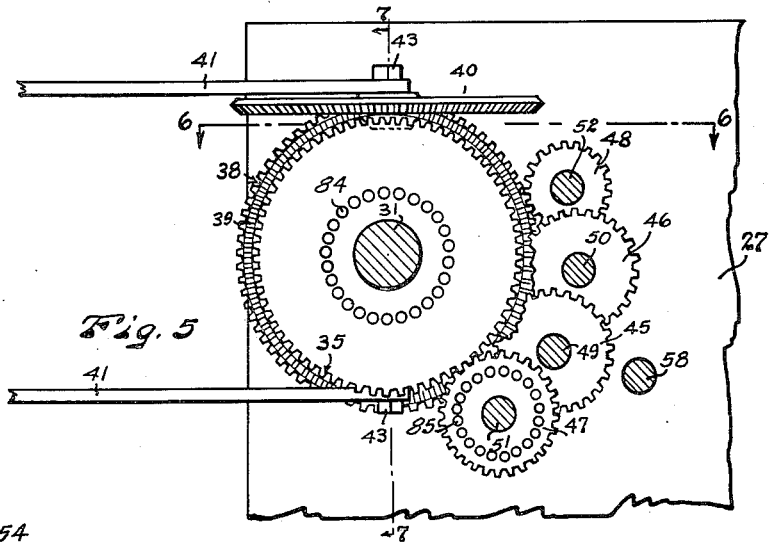
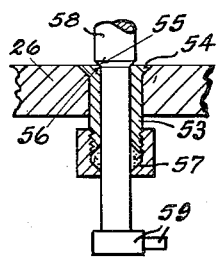
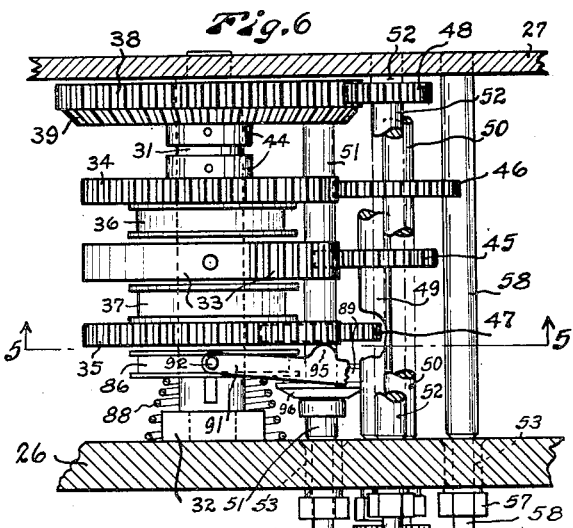
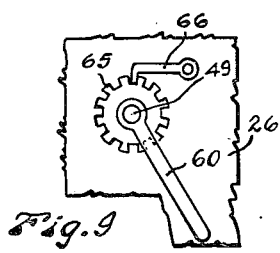
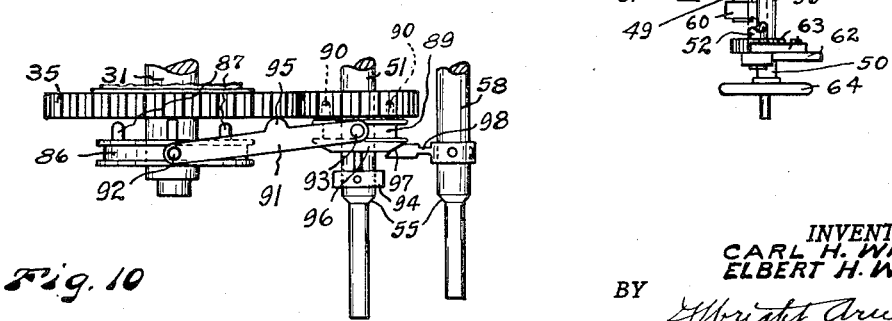

Patented Nov. 6, 1934

1,979,782

UNITED STATES PATENT OFFICE 1,979,782

MECHANICAL ARM AND HAND

Elbert Houston Wiley and Carl Haven Wiley, Seattle, Wash., assignors to Curtis-Wiley Marine Salvors, Seattle, Wash., a corporation of Washington Application December 16, 1931, Serial No. 581,374

18 Claims. (Cl. 61—69)

Our invention relates to a mechanical arm and hand and the general object of our invention is to provide an efficient arm and hand which is especially adapted for use on a diving bell.

Diving bells are essentially subjected to very high water pressures and mechanical arms, which necessarily function on the exterior of said bells, and are operated from the interior thereof, must be capable of withstanding this high pressure and must be freely and easily operable from within the bell without permitting any leakage of water into the bell.

It is a primary object of our invention to provide a mechanical arm of this nature having substantially all of the movements of the human arm and hand and having reliable and efficient means which are easily and speedily actuated and controlled from within the bell for imparting the several movements to the arm and hand.

Other primary objects of our invention are to provide a mechanical arm having universal pivotal movement within a limited range at the shoulder, and having pivotal movement in one plane at the elbow and having clamping jaws at the location of the hand which simulate the action of the fingers, together with means for imparting the several desired movements to the various parts and locking means for holding the fingers in engagement with an object while the arm is being moved.

The above mentioned general objects of our invention, together with others inherent in the same, are attained by the device, illustrated in the following drawings, the same being a preferred exemplary form of embodiment of our invention, throughout which drawings like reference numerals indicate like parts.

Fig. 3 is a detached elevation on a larger scale of the mechanical arm, parts being broken away.

Fig. 4 is a bottom plan view of said arm taken on line 4—4 of Fig. 3, with parts broken away.

Fig. 5 is a view partly in plan and partly in elevation on a larger scale substantially on broken line 5—5 of Fig. 2.

Fig. 6 is a plan view, with parts broken away and other parts in section, taken substantially on broken line 6—6 of Fig. 5.

Fig. 7 is a sectional view substantially on broken line 7—7 of Fig. 5.

Fig. 8 is a fragmentary sectional view showing a bushing and stuffing box.

Fig. 9 is a detached fragmentary elevation showing one of the means for locking one of the actuating shafts.

Fig. 10 is a detached plan view showing means for releasably locking certain gear wheels to their shafts.

Fig. 11 is a sectional view through the elbow joint of the mechanical arm substantially on broken line 11—11 of Fig. 3.

Figure 1:
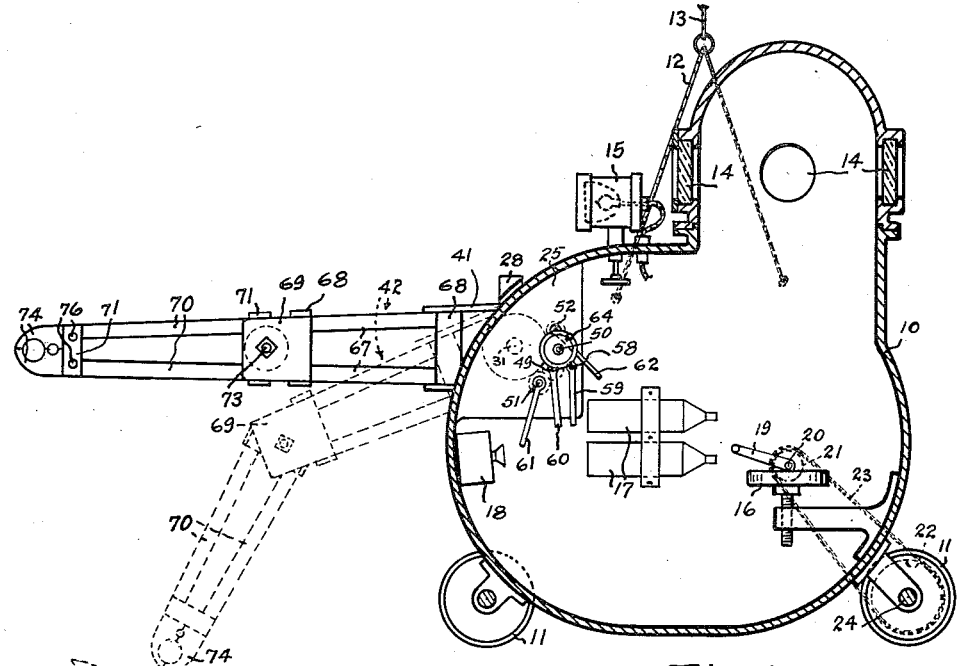
Figure 1 is a vertical section of a diving bell having a mechanical arm constructed in accordance with our invention, showing the arm moved at the elbow and vertically at the shoulder, in dotted lines.
Figure 2:
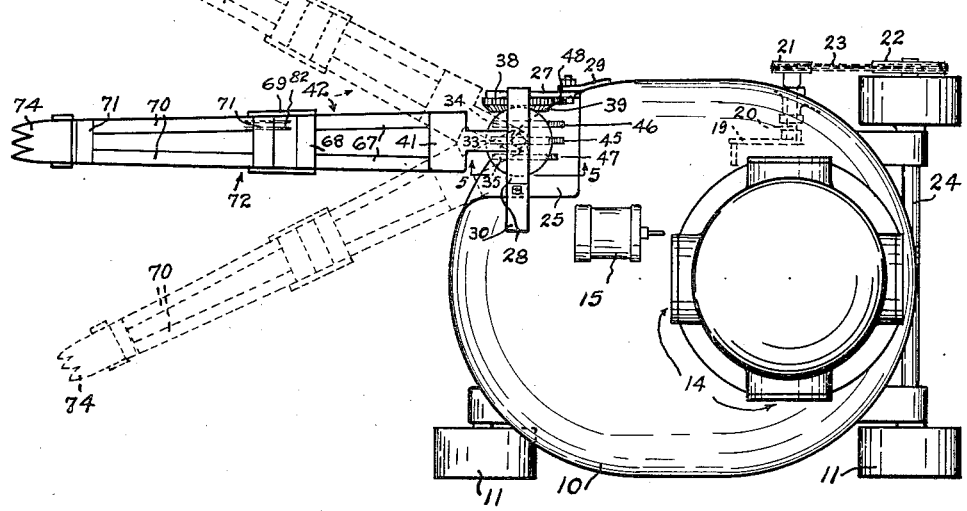
Fig. 2 is a plan view of the same, showing the arm moved horizontally at the shoulder, in dotted lines.

10 designates a diving bell having wheels 11 for supporting the same when on a solid surface and having sling means 12 adapted to be connected with a cable 13 for supporting said bell when in the water. It is preferable that the bell be suspended and positioned by tackle from a ship on the surface of the water, so that the bell will not rest on objects below the surface of the water and thereby stir up dirt, causing the water to become cloudy and muddy and lessening or entirely destroying visibility. The upper portion of the bell 10, in which the operator's head is normally positioned, is provided with a plurality of transparent sections 14, through which the operator may look in substantially all directions. The upper end of said bell, in which the sections 14 are positioned, is preferably removable to permit entrance and exit relative to the bell. A suitable electrically operated lamp 15 is preferably provided on the external forward portion of the bell for illuminating objects in the water. This lamp is connected with suitable means within the bell, by which it may be moved and selectively operated. A seat 16 is provided within the bell for the use of the operator, and suitable oxygen storage and air purifying apparatus, indicated generally at 17, is also provided within the bell. Telephone means 18 is also provided for establishing communication with persons on remote points, as in a mother ship above the bell.

Suitable means may be provided whereby the operator within the bell may rotate the rear wheels 11 for moving the diving bell over any surface on which it rests. This means may be in the form of a crank 19 on a shaft 20 which extends outwardly through the sides of the bell and is connected by sprocket wheels 21 and 22, and link belt 23 with the shaft 24 on which the two rear wheels 11 are non-rotatably mounted.

The forward portion of the diving bell 10 is preferably recessed on the upper right hand side, as indicated at 25, to afford a suitable location for the reception and attachment of a mechanical arm and actuating mechanism therefor, for the convenience of right-handed operators. A wall 26 positioned at the inner side of the recess 25, being a portion of the bell housing, forms one side of a mounting means, the other side of which is formed by a bracket plate 27, which is secured to the bell as by an upper bracket member 28, and a lower bracket member 29. To facilitate assembly and disassembly, an angle member 30 is preferably welded to the side of the bell and is detachably connected with bracket member 28. The bracket member 29 is also preferably welded to the side of the bell and detachably connected with plate 27.

A main shaft 31 is journaled in plate 27 and in a mounting hub 32, which hub 32 is secured to the wall 26, preferably by welding. A gear segment 33 (see Fig. 6) is non-rotatably mounted on the shaft 31 substantially midway between the two ends thereof. Two gearwheels 34 and 35 having sheaves 36 and 37 rigidly connected respectively therewith, are rotatively mounted on shaft 31 on opposite sides of gear member 33. Another gearwheel 38 is rotatively mounted on the shaft 31 adjacent the plate 27. The gearwheel 38 has a bevel gear 39 rigidly connected therewith. The bevel gear 39 meshes with another bevel gear 40, (see Fig. 5), which gear 40 is fixedly secured to the upper arm of the bifurcated portion 41 of the upper arm proper, which is designated generally by 42. The bifurcated end portions 41 of the upper arm 42, together with the bevel gear 40, are secured to the gear member 33 by pivot means 43, the axis of which intersects the axis of the main shaft 31 at right angles. Suitable collars 44 are provided for limiting endwise movement of the several gearwheels along the shaft 31.

Gear member 33 and gearwheels 34, 35 and 38 are intermeshed with driving gears 45, 46, 47, and 48 respectively. Driving gears 45, 46, and 48 are non-rotatably secured on actuating shafts 49, 50, and 52 respectively, while driving gear 47 is rotatively mounted on actuating shaft 51, but may be non-rotatably locked to said shaft 51 by mechanism hereinafter described. The actuating shafts 49, 50, 51, and 52 all extend through the wall 26 and terminate within the diving bell 10. Suitable bushings 53 (one of said bushings being shown in cross section in Fig. 8) are provided in the wall 26 for the actuating shafts 49, 50, 51, and 52 to pass through. These bushings 53 are preferably securely welded within the wall 26 and have enlarged heads 54 on their outer sides which precludes any possibility of the bushings being forced through the diving bell 26 by external pressure. The actuating shafts 49, 50, 51, and 52 (see Figs. 5 and 6) are of reduced diameter where they pass through the bushings to afford conical shoulders 55, which seat on conical seats 56 in the ends of the bushings and the external water pressure tends to form a tight seal at the seat 56, and thereby excludes water. Obviously the relatively high pressure exerted on the outer ends of the actuating shafts will be borne on the seats 56, which seats are relatively small in area, thereby obviating excessive friction and leaving the actuating shafts freely movable. Suitable stuffing boxes 57 are provided on the bushings 53 within the diving bell to act as auxiliary means to prevent leakage of any water which might pass the seats 56.

A locking shaft 58 also extends through the wall 26, and a bushing 53 of the form hereinbefore described, is provided for said locking shaft. The inner end of the locking shaft 58 has a lever arm 59 provided thereon. Lever arms 60, 61, and 62 are also provided on the ends of actuating shafts 49, 51, and 52. The lever arm 62 is preferably connected with the shaft 52 by ratchet and pawl means 63, which permits the actuating shaft 52 to be rotated any desired amount irrespective of obstructions which may be in the path of the lever arm 62. The shaft 50 preferably extends through the wall 26 farther than the other shafts and preferably has a hand wheel 64 secured thereon. Suitable means are provided for locking both the shaft 50 and the shaft 49 against rotation. This means may be in the nature of a toothed wheel 65 (see Fig. 9) on the shaft which is arranged to be engaged by a pawl 66 pivotally connected to the adjacent wall 26. The pawls 66 are preferably arranged so that they will remain in a disengaged position when not in use.

The upper arm 42 (see Figs. 3 and 4) is preferably formed of four angle bars 67, arranged preferably in rectangular position and connected with each other by cross pieces 68, thereby leaving an open central portion for the passage of belt type operating means therethrough. The inner end of the upper arm 42 is connected with the bifurcated members 41, preferably by welding, as hereinbefore described. The outer end of the upper arm 42 has a bifurcated end formed by outwardly projecting members 69, secured to the respective sides of said upper arm preferably by welding. A forearm, also preferably formed of four rectangularly positioned angle bars 70 secured together by cross pieces 71, has portions 72 projecting from its inner end which interfit the bifurcated portion 69 on the upper arm, and are secured thereto by pivot studs 73. Two pivots 73 are used in this connection to leave an open central portion through which belt type actuating means may pass, as hereinafter described.

Two clamping jaws 74 are removably secured to two gear segments 75 which are rotatably mounted on transverse pivots 76 at the outer end of the forearm, said gear segments intermeshing with each other to thereby produce simultaneous opening and closing of said two clamping jaws. Obviously, as clamping jaws 74 are detachably secured, various sizes and shapes of clamping jaws may be used, depending upon the type of the work to be performed thereby. One of the clamping jaws is removed in Fig. 4. A sheave 77 is rigidly secured to one of the gear segments 75 for engagement by a flexible belt type actuating member 78, which extends around and is secured to the sheave 77 in such a manner as to prevent slippage of the member 78 on the sheave 77 and yet to permit the sheave 77 to be turned in either direction by movement of the member 78. The member 78 extends inwardly through the open central portion of the forearm and passes between guide sheaves 79 which are operatively mounted, as hereinafter fully described, at the location of the elbow shaft 73, thence the member 78 extends inwardly through the open upper arm 42, and passes around and is secured to the sheave 37 which is connected with gear wheel 35.

Pivot bolts 73 (see Fig. 11) are preferably rigidly secured to plates 80. Plates 80 have mounted on their inner surface the guide pulleys 79, which guide pulleys 79 are rotatively secured to plates 80 by means of studs 81, so that two openings are provided, one on either side respectively for the positioning of the belt type member 78, said openings being coaxial with pivot bolts 73.

Sheave 82 (see Figs. 3 and 4) is rigidly attached, as by welding, to the inner end portion 72 of the forearm. Belt type operating member 83 passes around and is secured to sheave 82 in a similar manner to that described in connection with sheave 77 and belt type member 78. Belt type member 83 passes through the central open portion of the upper arm 42 and thence around sheave 36. Belt type member 83 is similarly attached to sheave 36 to be moved by the turning of sheave 36 and to prevent slippage between this member and sheave 36.

In providing locking and disengaging means for gear 35, (see Figs. 5, 6, and 10) a series of holes 84, on the side of the gear 35 adjacent the diving bell, are centered upon a circle coaxial with the center of the main shaft 31 and are positioned closely together. A similar series of holes 85, arranged in a circular path around the shaft 51, is provided on gear 47. Peripherally grooved locking disk 86, preferably with two extending pawls 87 adapted to engage within two of the holes 84, is non-rotatably secured to main shaft 31 and is urged into engagement with the wheel 35 by spring 88. A similarly constructed peripherally grooved locking disk 89, having pawls 90, is non-rotatably mounted on shaft 47 (see Fig. 10). Shifter member 91 is provided with pawls 92 and 93 upon its respective ends for the engagement of the peripheral grooves on disks 86 and 89 respectively. Collar 94 is provided on shaft 51 to restrict movement of disk 89 toward the bell. Shifter member 91 has a lug 95 positioned adjacent gear 35, which lug acts as a fulcrum so that the pawls 92 and 93 upon the respective ends of the shifter move in opposite directions. Shifter member 91 is of sufficient thickness to prevent the same from entering into the peripheral grooves on disks 86 and 89. Disk 89 is provided with frustro-conical surface 96, adapted to be engaged by the incline surface 97 of the pawl 98, which pawl is rigidly secured to shaft 58, whereby the turning of shaft 58 will urge the locking disk 89 toward the gear 47, and through the shifter member 91, the disk 86 will be urged away from gear 35. Obviously, when the pressure of pawl 98 is released from disk 89, the spring 88 will urge the disk 86 toward the gear 35, and through the shifter member, the disk 89 will be urged away from the gear 47.

In the operation of our device, as the operator turns lever arm 60, actuating shaft 49 is turned, which in turn moves gear 45, which turns gear member 33. As gear member 33 is turned, the bifurcated end portion 41 of forearm 42 is oscillated vertically about shaft 31, thereby affording up and down movement from the shoulder of our mechanical arm. To hold the arm in selected positions into which it is moved by reason of the vertical shoulder movement, the toothed wheel 65 and pawl 66 are operatively connected with the shaft 49.

When hand wheel 64 is turned, actuating shaft 50, driving gear 46, gearwheel 34, sheave 36, belt type operating member 83, sheave 82, and arm portion 72 are each in turn operated. This turning provides vertical movement for the elbow and a similar brake, as described in connection with the vertical shoulder movement, may be here used.

For the convenience of checking, the following sequence of parts is set forth:

| Sheave | Belt member | Sheave | Gear | Gear | Shaft | Arm or wheel |
|---|---|---|---|---|---|---|
| 82 | 83 | 36 | 33 | 45 | 49 | 60 |
| 77 | 78 | 37 | 34 | 46 | 50 | 64 |
|  |  |  | 35 | 47 | 51 | 61 |
|  |  |  | 38 | 48 | 52 | 62 |
|  |  |  |  |  | 58 | 59 |

When the lever arm 62 is moved, it turns the shaft 52 by the ratchet and pawl means 63, gears 48 and 38, bevel gear 39, and bevel gear 40. This moves the said bifurcated end portion 41 of the upper arm 42 angularly in a horizontal direction about pivot bolts 43, permitting thereby the other movement of the shoulder, that is, sidewise or horizontal movement. In connection with the horizontal movement at the shoulder, no pressure or weight tends to turn this member in either direction horizontally and therefore, a brake is not necessary for this member.

As lever arm 61 is turned, actuating shaft 51, driving gear 47, gearwheel 35, sheave 37, belt type actuating member 78, and sheave 77 are in turn operated. As sheave 77 is turned, the gear segments 75, which are geared together for opposite rotation, will turn, thereby opening and closing the two clamping jaws 74. The belt type actuating member 78 passes between the guide pulleys 79 so that belt type member 78 will not be tightened or loosened by the vertical movement of the forearm about the elbow joint.

As an operator works our mechanical arm, he may grasp an article with the jaws 74, and the jaws just be kept tightly around the article or obviously the article will be released. To provide for such locking movement, and to prevent the jaws from being loosened or tightened by the other movements, we have provided the lever arm 59, locking shaft 58, (see Figs. 6 and 10) pawl 98, locking disks 89 and 86, shifter member 91 and spring 88. The operator may, by this locking mechanism, lock sheave 37 to the main shaft 31 and release the sheave 37 from its operating mechanism and thereafter sheave 37 becomes fixed to shaft 31, so that as shaft 31 is turned to afford vertical movement of the shoulder, the relative position between the main shaft 31 and the sheave 37 will not change and thereby the jaws are kept in the selected position, regardless of the shoulder movement.

The locking mechanism used to prevent any movement of the jaws 74, can of course be used to lock the shoulder and elbow against vertical movement. However, it is not necessary to provide such accurate means for locking the shoulder and elbow against vertical movement, and the pawl and wheel previously described, and shown in Fig. 9, are less expensive and well serve such purpose.

We have provided a mechanical arm to be used from a submergible bell, which mechanical arm has universal movement and an operator within the bell is able to work rapidly and efficiently at great depths without the water pressure slowing up the operation of the mechanical arm. In our diving apparatus, the operator need only to come to the surface to obtain a fresh supply of oxygen, and he is able, by our apparatus, to do long and tedious work below the surface of the water.

Obviously, changes may be made in the forms, dimensions, and arrangement of the parts of our invention, without departing from the principle thereof, the above setting forth only preferred forms of embodiment.

We claim:

1. In a device of the class described, a diving bell; an arm pivoted at one end for horizontal and vertical swinging movement on two fixed axes on said diving bell, which fixed axes are positioned in a common plane and intersect each other at right angles; and means actuated from within the diving bell for pivoting said arm on said axes.

2. In a device of the class described, a diving bell; an upper arm pivoted at one end for horizontal and vertical swinging movement on two fixed axes on said diving bell, which fixed axes are positioned in a common plane and intersect each other at right angles; means actuated from within said bell for pivoting said upper arm on said axes; a forearm pivotally connected with the outer end of said upper arm; and means actuated from within the bell for operating said forearm.

3. In a device of the class described, a diving bell; an upper arm pivoted at one end for horizontal and vertical swinging movement on two fixed axes on said diving bell, which fixed axes are positioned in a common plane and intersect each other at right angles; a forearm pivoted for vertical swinging movement on the outer end of said upper arm; clamping jaws pivotally mounted on the outer end of said forearm; and means actuated from within the diving bell for operating said upper arm, said forearm and said clamping means.

4. In a device of the class described, a diving bell; an arm pivoted at one end for horizontal and vertical swinging movement on two fixed axes on said diving bell, which fixed axes are positioned in a common plane and intersect each other at right angles; and two independent operating devices independently actuated from within said bell for imparting vertical and horizontal swinging movement respectively to said arm.

5. In a device of the class described, a diving bell; an arm connected to said diving bell; a forearm pivoted for swinging movement on the outer end of said first named arm; guide means coaxially disposed as respects said pivotal connection; clamping jaws pivotally mounted on the outer end of said last named arm; belt type operating means connected with said jaws and extending through said guide means; and means actuated from within the diving bell for operating said last named arm; and the belt type operating means for said clamping jaws.

6. In a device of the class described, a diving bell; an upper arm pivoted for horizontal and vetrical swinging movement on said diving bell; a forearm pivoted for vertical swinging movement on the outer end of said upper arm; guide means on the outer end of the upper arm; clamping jaws pivotally mounted on the outer end of said forearm; belt type operating means connected with said jaws and extending through said guide means; and means actuated from within the diving bell for operating said upper arm, said forearm, and the belt type operating means for said clamping jaws.

7. In a device of the class described, a diving bell; a pivotally connected upper arm on said diving bell; a forearm pivotally connected on the outer end of said upper arm; clamping means positioned on the outer end of said forearm; a plurality of means actuated from within the diving bell mechanically connected with and operating said upper arm, said forearm, and said clamping means, independently; and mechanical means locking the clamping means in a selective position against movement as the arms are pivoted.

8. In a device of the class described, a diving bell; an arm externally pivoted on said bell; clamping jaws, adapted for opening and closing movements, positioned on the outer end of said arm; a plurality of operating means positioned externally as respects said bell and adapted to independently mechanically operate said arm and jaws; actuating means operable from within the bell and mechanically connected to said operating means; and locking means mechanically securing the clamping means in a selective position irrespective of movement of the arm.

9. In a device of the class described, a diving bell; an arm externally pivoted on said diving bell; means actuated from within the bell for moving said arm; clamping jaws mounted for opening and closing movement on the outer end of said arm; operating means for said clamping jaws; actuating means operable from within the bell for moving said jaw operating means; and mechanism for selectively locking said jaw operating means relative to said jaws and simultaneously disengaging said jaw operating means relative to its actuating means, or for selectively unlocking said jaw operating means relative to said jaws and simultaneously engaging said jaw operating means relative to its actuating means.

10. In a device of the class described, a main shaft; a gear member on said main shaft; an upper arm pivoted on said gear member on an axis which intersects the axis of said main shaft at right angles; another gear member secured to said upper arm coaxially with the pivot thereof; a gearwheel rotatably mounted on said main shaft and meshing with said last named gear member; and means for independently rotating the gearwheel, and the gear member which are mounted on said main shaft, whereby swinging movement in two planes at right angles relative to each other may be imparted to said upper arm.

11. In a device of the class described, a main shaft; a gear member on said main shaft; an upper arm pivoted on said gear member on an axis which intersects the axis of said main shaft at right angles; a forearm pivoted to the outer end of said upper arm; another gear member secured to said upper arm coaxially with the pivot thereof; a gearwheel rotatably mounted on said main shaft, and meshing with said last named gear member; another gearwheel mounted on said main shaft; a sheave secured to said last named gearwheel; belt type operating means connecting said sheave with the pivoted end of said forearm; and independent means for imparting rotary movement to each gearwheel and gear member on said main shaft, whereby swinging movement in one plane will be imparted to said forearm and swinging movement in two planes at right angles to each other will be imparted to said upper arm.

12. In a mechanical arm and actuating means therefor, a main shaft; a gear member on said main shaft; an upper arm pivoted on said gear member on an axis which intersects the axis of said main shaft at right angles; another gear member secured to said upper arm coaxially with the pivot thereof; a gearwheel rotatably mounted on said main shaft and meshing with said last named gear member; two other gearwheels rotatably mounted on said main shaft; a sheave carried by each said last named gearwheels; a forearm pivotally connected with the outer end of said upper arm; clamping jaws mounted for relative opening and closing movements on the outer end of said forearm; belt type operating means connecting said clamping jaws with one of said sheaves; other belt type operating means connecting said forearm with the other sheaves; and independent means for rotating each gearwheel and gear member on said main shaft.

13. In a mechanical arm and actuating means therefor, a main shaft; a gear member non-rotatable on said main shaft; an upper arm pivoted on said gear member on an axis which intersects the axis of said main shaft at right angles; another gear member secured to said upper arm coaxially with the pivot thereof; a gearwheel rotatably mounted on said main shaft and meshing with said last named gear member; two other gearwheels rotatably mounted on said main shaft; a sheave carried by each said last named gearwheels; a forearm pivotally connected with the outer end of said upper arm; clamping jaws mounted for relative opening and closing movements on the outer end of said forearm; belt type operating means connecting said clamping jaws with one of said sheaves; and means for selectively locking and releasing said sheave and the gearwheel, which is connected therewith, relative to said main shaft, whereby said clamping jaws may be held non-movable in a selected position relative to each other.

14. In a device of the class described, a main shaft; a gear member on said main shaft; an arm pivoted on said gear member on an axis which intersects the axis of said main shaft at right angles; clamping jaws mounted for relative opening and closing movement on the other of said arm; another gear member secured to said upper arm coaxially with the pivot thereof; a gearwheel rotatably mounted on said main shaft and meshing with said last named gear member; another gearwheel mounted on said main shaft; a sheave secured to said last named gearwheel; belt type operating means connecting said sheave with said clamping jaws; and independent means for imparting rotary movement to the gearwheel and gear member on said main shaft.

15. In a device of the class described, a main shaft; a gear member non-rotatably mounted on said main shaft; an upper arm pivoted on said gear member on an axis which intersects the axis of said main shaft at right angles; clamping jaws mounted for relative opening and closing movement on the other end of said arm; another gear member secured to said upper arm coaxially with the pivot thereof; a gearwheel rotatably mounted on said main shaft and meshing with said last named gear members; another gearwheel mounted on said main shaft; a sheave secured to said last named gearwheel; belt type operating means connecting said sheave with said clamping jaws; means for selectively locking and releasing said sheave and the gearwheel which is connected therewith relative to said main shaft; and independent means for imparting rotary movement to the gearwheel and gear member on said main shaft.

16. In operating means for a mechanical arm, a main shaft; a plurality of driven gears on said main shaft; a plurality of driving gears engaging respective driven gears; sheaves connected with some of said driven gears; independent actuating means for said driving gears; clamping jaws mounted for relative opening and closing movement and operatively connected with one of said sheaves and selectively controlled locking and releasing means for the one of said gears and the sheave connected therewith, which gear and sheave are operatively connected with the clamping jaws.

17. In operating means for a mechanical arm, a main shaft; a driven gear member non-rotatably mounted on said main shaft; a plurality of driven gears rotatably mounted on said main shaft; a plurality of driving gears engaging respective driven gears, and the said driven gear member; independent actuating means for said driving gears; clamping jaws mounted for relative opening and closing movement and operatively connected with one of said driven gears and selectively controlled means adapted to non-rotatably connect the one of said rotatable gears with said main shaft, which gear is operatively connected with said clamping jaws.

18. In operating means for a mechanical arm, a main shaft; a driven gear rotatable on said shaft; clamping jaws mounted for relative opening and closing movement and operatively connected with said driven gear, an actuating shaft; a driving gear rotatable on said actuating shaft; and selectively operated control means adapted to rotatably connect the driven gear with its shaft and simultaneously to non-rotatably connect the driving gear with its shaft or to non-rotatably connect the driven gear with its shaft and to simultaneously rotatably connect the driving gear with its shaft.

ELBERT HOUSTON WILEY.
CARL HAVEN WILEY.